United States Patent
Notoshi et al.

(10) Patent No.: US 10,908,456 B2
(45) Date of Patent: *Feb. 2, 2021

(54) BACKLIGHT MODULE FOR LIQUID CRYSTAL DISPLAY DEVICE

(71) Applicant: Panasonic Liquid Crystal Display Co., Ltd., Hyogo (JP)

(72) Inventors: Tomoharu Notoshi, Hyogo (JP); Yasuyuki Doi, Hyogo (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/667,333

(22) Filed: Oct. 29, 2019

(65) Prior Publication Data
US 2020/0064691 A1  Feb. 27, 2020

Related U.S. Application Data

(63) Continuation of application No. 15/882,026, filed on Jan. 29, 2018, now Pat. No. 10,495,924.

(30) Foreign Application Priority Data

Feb. 1, 2017  (JP) .................................. 2017-017168

(51) Int. Cl.
*G02F 1/13357* (2006.01)
*G09G 3/34* (2006.01)
(Continued)

(52) U.S. Cl.
CPC .......... *G02F 1/133603* (2013.01); *G01F 3/00* (2013.01); *G02F 1/00* (2013.01);
(Continued)

(58) Field of Classification Search
CPC .................. G02F 1/133603; G02F 1/00; G02F 1/136286; G02F 2001/133612;
(Continued)

(56) References Cited

U.S. PATENT DOCUMENTS

2006/0175986 A1* 8/2006 Lee ........................ H05B 45/20
315/312
2008/0238337 A1* 10/2008 Masood ................. H05B 45/37
315/294
(Continued)

FOREIGN PATENT DOCUMENTS

CN  101436393  5/2009
JP  09-244570   9/1997
(Continued)

*Primary Examiner* — Ibrahim A Khan
(74) *Attorney, Agent, or Firm* — Wenderoth, Lind & Ponack, L.L.P.

(57) ABSTRACT

A backlight module for a liquid crystal display includes: LEDs; LED drivers; a controller that outputs data and the latch signal to the LED drivers; data lines for transmitting the data; and latch signal lines for transmitting the latch signal. The latch signal lines are wired according to each of a plurality of first groups obtained by dividing LED drivers. The data lines are wired according to each of a plurality of second groups, which are constructed with a collection of at least one LED driver selected from each of the plurality of first groups without duplication, and each data line is commonly connected to at least one LED belonging to the corresponding second group.

20 Claims, 6 Drawing Sheets

(51) Int. Cl.
  *G02F 1/1362*  (2006.01)
  *G01F 3/00*  (2006.01)
  *G02F 1/00*  (2006.01)
  *H05B 45/10*  (2020.01)

(52) U.S. Cl.
  CPC ....... *G02F 1/136286* (2013.01); *H05B 45/10* (2020.01); *G09G 2310/0264* (2013.01); *Y02B 20/30* (2013.01)

(58) Field of Classification Search
  CPC ......... G02F 2001/133601; H05B 45/10; G01F 3/00; Y02B 20/30; G09G 2310/0264; G09G 2310/0286; G09G 2310/0291; G09G 3/3426
  See application file for complete search history.

(56) References Cited

U.S. PATENT DOCUMENTS

| | | | | |
|---|---|---|---|---|
| 2009/0073109 A1* | 3/2009 | Shin | ............... | G09G 3/3426 345/102 |
| 2009/0213103 A1* | 8/2009 | Tanaka | ............... | G09G 3/342 345/211 |
| 2009/0309498 A1* | 12/2009 | Park | ............... | G02F 1/133603 315/32 |
| 2009/0309855 A1* | 12/2009 | Wang | ............... | G09G 3/3426 345/204 |
| 2010/0120471 A1* | 5/2010 | Uchikawa | ............... | H04W 52/0209 455/566 |
| 2010/0194285 A1* | 8/2010 | Byun | ............... | G09G 3/3406 315/125 |
| 2010/0295767 A1* | 11/2010 | Lee | ............... | G09G 3/3611 345/102 |
| 2011/0012521 A1* | 1/2011 | Byun | ............... | H04B 45/46 315/186 |
| 2011/0031492 A1* | 2/2011 | Yamazaki | ............... | H01L 27/3262 257/43 |
| 2011/0062874 A1* | 3/2011 | Knapp | ............... | H04L 12/437 315/158 |
| 2011/0096099 A1 | 4/2011 | Yamamoto et al. | | |
| 2012/0056561 A1* | 3/2012 | Adachi | ............... | G09G 3/00 315/297 |
| 2012/0139823 A1* | 6/2012 | Fujiwara | ............... | H04N 5/66 345/102 |
| 2012/0242713 A1* | 9/2012 | Yagi | ............... | H05B 45/44 345/690 |
| 2013/0099681 A1* | 4/2013 | Williams | ............... | H05B 45/347 315/185 R |
| 2014/0354176 A1* | 12/2014 | Chen | ............... | G09G 3/3426 315/294 |
| 2015/0279267 A1* | 10/2015 | Tien | ............... | H05B 45/00 345/690 |
| 2015/0359067 A1* | 12/2015 | Kurita | ............... | G02F 1/133603 315/151 |
| 2016/0042719 A1* | 2/2016 | Muramatsu | ............... | G09G 5/18 345/213 |

FOREIGN PATENT DOCUMENTS

| | | |
|---|---|---|
| JP | 2010-217568 | 9/2010 |
| JP | 2012-59465 | 3/2012 |
| WO | 2010/004871 | 1/2010 |

* cited by examiner

BACKLIGHT MODULE FOR LIQUID CRYSTAL DISPLAY DEVICE

CROSS-REFERENCE TO RELATED APPLICATION

This application claims priority from Japanese application JP 2017-017168, filed Feb. 1, 2017. This Japanese application is incorporated herein by reference.

TECHNICAL FIELD

The present invention relates to a backlight module for a liquid crystal display device. Specifically, the present invention relates to a backlight module for a liquid crystal display device which is suitable for local dimming.

BACKGROUND

In a liquid crystal panel, a contrast ratio in an identical screen can significantly be enhanced by local dimming. In the local dimming, the whole screen is partitioned into some partitions, and brightness of a backlight is optimally adjusted according to brightness of an image projected onto each partition.

Conventionally, various circuit configurations have been proposed as a circuit configuration of a liquid crystal backlight module corresponding to the local dimming (for example, see Unexamined Japanese Patent Publication No. 2012-59465).

In Unexamined Japanese Patent Publication No. 2012-59465, a plurality of LED drivers are connected to each other in a daisy chain system, thereby reducing a wiring amount, compared with the case that a controller that controls the plurality of LED drivers is connected to the plurality of LED drivers in a one-to-one relation.

SUMMARY

However, in the daisy chain system of Unexamined Japanese Patent Publication No. 2012-59465, a capacity of data transmitted between the LED drivers increases, and management of control timing becomes difficult in a scene, such as multiple division local dimming, in which many LEDs are simultaneously controlled, which results in control complication caused by a countermeasure for a processing delay or degradation of image quality.

The present disclosure provides a backlight module for a liquid crystal display that can prevents the complicated control or the degradation of the image quality while reducing a number of wirings connecting the controller and the plurality of LED drivers compared with one-to-one connection.

To solve the above problem, a backlight module for a liquid crystal display according to a present disclosure, which illuminates a liquid crystal display panel from a rear surface, comprises: a plurality of LEDs; a plurality of LED drivers including an input circuit that receives externally-input data, a register that holds the data input to the input circuit in synchronization with an externally-input latch signal, and a driving circuit that drives at least one corresponding LED in the plurality of LEDs according to the data held by the register; a controller that is a control circuit that outputs the data and the latch signal to the plurality of LED drivers; a plurality of data lines through which the data output from the controller is transmitted to the plurality of LED drivers; and a plurality of latch signal lines through which the latch signal output from the controller is transmitted to the plurality of LED drivers. The plurality of latch signal lines are provided so as to correspond a plurality of first groups obtained by dividing the plurality of LED drivers respectively, and each of the plurality of latch signal lines is commonly connected to at least one LED driver belonging to a corresponding one of the plurality of first group. The plurality of data lines are provided so as to correspond a plurality of second groups respectively, and the plurality of second groups are constructed by collecting at least one LED driver selected from each of the plurality of first groups without duplication. Each of the plurality of data lines is commonly connected to at least one LED driver belonging to a corresponding one of the plurality of second group.

DETAILED DESCRIPTION

The following describes an exemplary embodiment of the present disclosure. The embodiment described below is merely one specific example of the present disclosure. The numerical values, shapes, materials, elements, and arrangement and connection of the elements, etc. indicated in the following embodiment are given merely by way of illustration and are not intended to limit the present disclosure. Therefore, among elements in the following embodiment, those not recited in any one of the independent claims defining the broadest inventive concept of the present disclosure are described as optional elements.

Note that the figures are schematic illustrations and are not necessarily precise depictions. Accordingly, the figures are not necessarily to scale. Moreover, in the figures, elements that are essentially the same share like reference signs. Accordingly, duplicate description is omitted or simplified.

Figure 1:
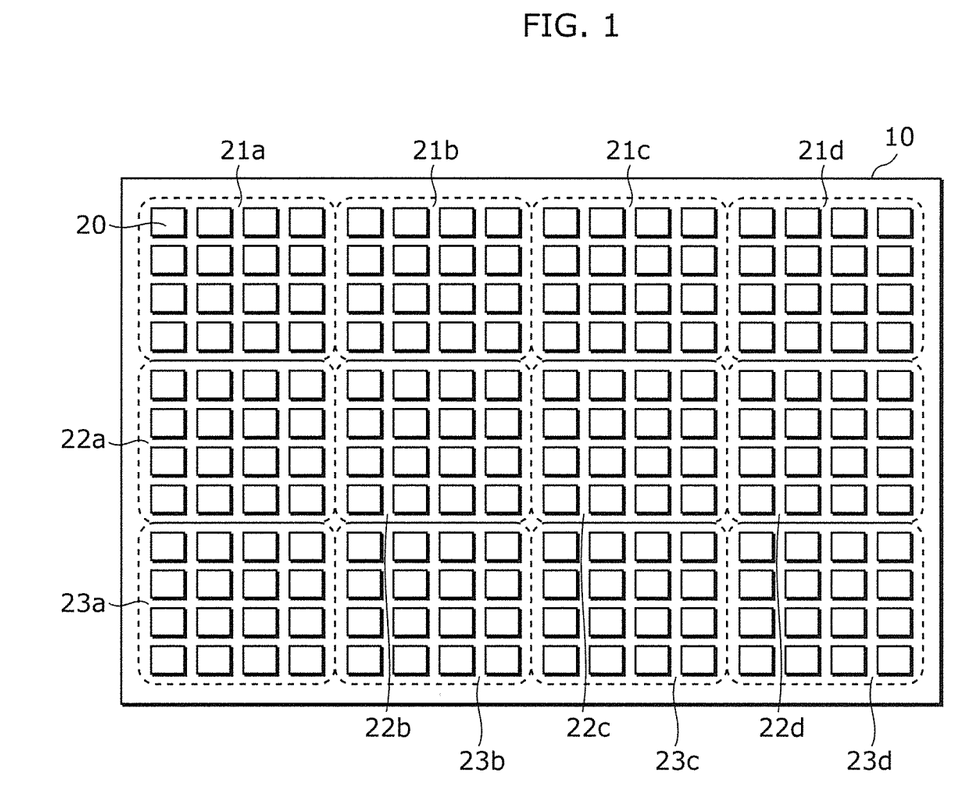
FIG. 1 is a view illustrating arrangement of LEDs included in a backlight module for a liquid crystal display according to a present exemplary embodiment.

FIG. 1 is a view illustrating arrangement of LEDs 20 included in backlight module 10 for a liquid crystal display according to an exemplary embodiment. Backlight module 10 is a backlight suitable for local dimming, and includes a total of 12×16 LEDs 20 arranged two-dimensionally. LEDs 20 are classified into 12 groups 21a to 21d, 22a to 22d, 23a to 23d in units of 16 LEDs. LEDs 20 belonging to each group are driven by a corresponding LED driver.

Figure 2:
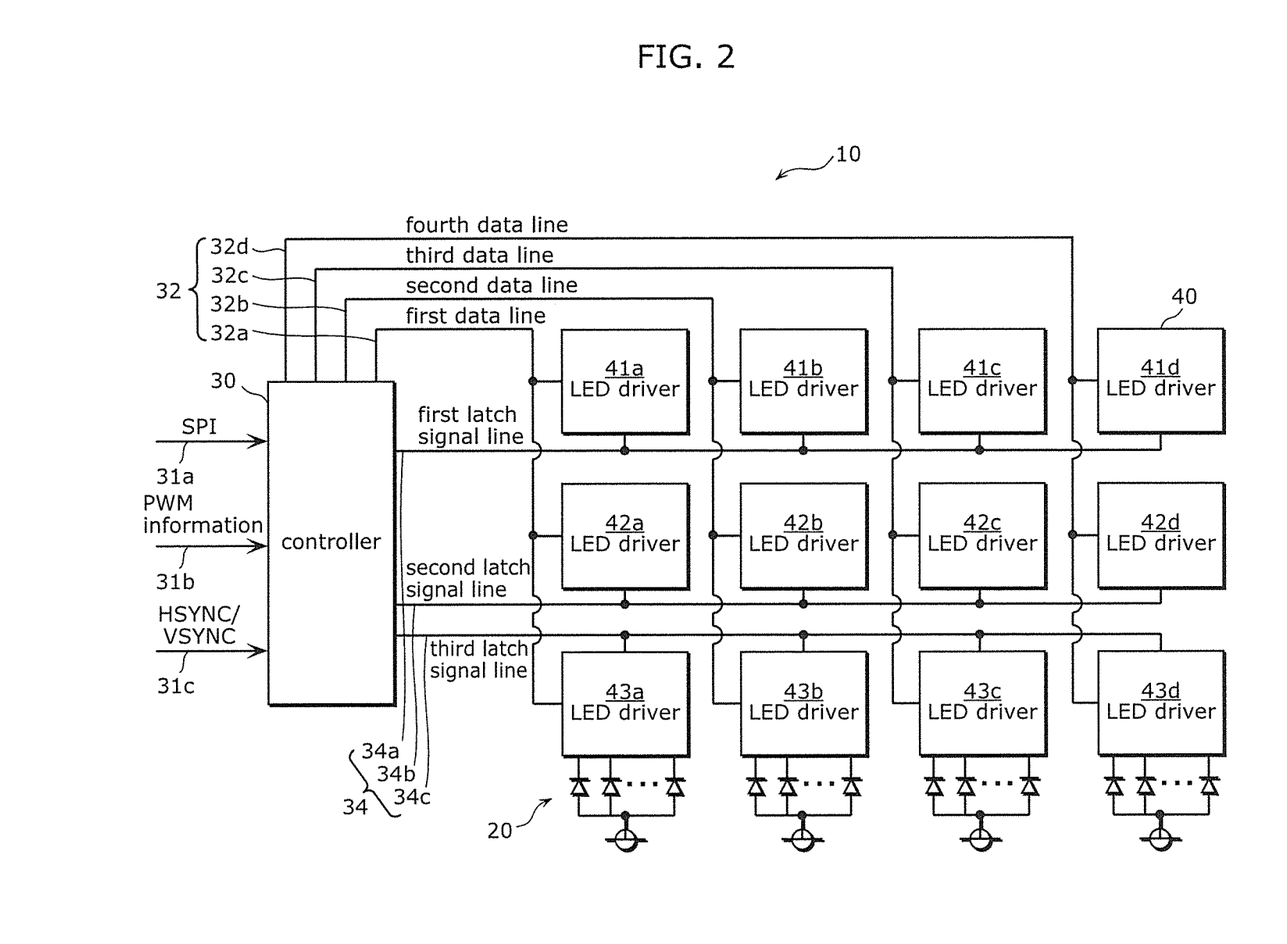
FIG. 2 is a block diagram illustrating a circuit configuration of the backlight module according to the present exemplary embodiment.

FIG. 2 is a block diagram illustrating a circuit configuration of backlight module 10 according to the exemplary embodiment. Backlight module 10 is a direct under type backlight that illuminates a liquid crystal display panel from a rear surface. Backlight module 10 includes a plurality of LEDs 20, a plurality of LED drivers 40, controller 30, a plurality of data lines 32, and a plurality of latch signal lines 34.

The plurality of LEDs 20 are the total of 12×16 LEDs 20 in FIG. 1. Data and a latch signal are input to each of the plurality of LED drivers 40, and each of the plurality of LED drivers 40 drives a plurality of (in this case, 16) LEDs 20 according to the written data. The plurality of LED drivers 40 is constructed with a total of 12 LED drivers having an identical function. Four LED drivers 41a to 41d are disposed in a first row, four LED drivers 42a to 42d are disposed in a second row, and four LED drivers 43a to 43d are disposed in a third row. Each of LED drivers 41a to 41d drives 16 LEDs belonging to groups 21a to 21d in FIG. 1. Each of LED drivers 42a to 42d drives 16 LEDs belonging to groups 22a to 22d in FIG. 1. Each of LED driver 43a to 43d drives 16 LEDs belonging to groups 23a to 23d in FIG. 1.

Controller 30 is a control circuit that outputs the data and the latch signal to the plurality of LED drivers 40. Controller 30 includes a terminal that receives serial peripheral interface (SPI) 31a and pulse width modulation (PWM) information 31b and a terminal that receives HSYNC/VSYNC 31c as input terminals. Individual dimming information designating a dimming level corresponding to each of the plurality of LEDs 20 is serially input to SPI 31a. PWM information 31b is whole dimming information designating the dimming level common to the plurality of LEDs 20. HSYNC/VSYNC 31c is a horizontal synchronizing signal and a vertical synchronizing signal. Controller 30 receives the individual dimming information from an outside in a form of SPI 31a, receives PWM information 31b as the whole dimming information, generates data for each of the plurality of LEDs 20 to emit light at an adjustment level obtained by multiplying the corresponding individual dimming information by the whole dimming information, and outputs the generated data to the plurality of LED drivers 40 through the plurality of data lines 32. Controller 30 is constructed with a microcomputer including a ROM in which a program is stored, a RAM, a processor that executes the program, and an input and output port.

The plurality of latch signal lines 34 are a wiring through which the latch signal output from controller 30 is transmitted to the plurality of LED drivers 40. The plurality of latch signal lines 34 are provided so as to correspond the plurality of first groups (in this case, LED drivers 40 disposed in an identical row) obtained by dividing the plurality of LED drivers 40, respectively. Each of the plurality of latch signal lines 34 is commonly connected to at least one LED driver 40 belonging to the corresponding first group. That is, the plurality of latch signal lines 34 are constructed with three latch signal lines, namely, first latch signal line 34a that commonly supplies the latch signal to LED drivers 41a to 41d disposed in the first row, second latch signal line 34b that commonly supplies the latch signal to LED drivers 42a to 42d disposed in the second row, and third latch signal line 34c that commonly supplies the latch signal to LED drivers 43a to 43d disposed in the third row.

The plurality of data lines 32 are a wiring through which the data output from controller 30 is transmitted to the plurality of LED drivers 40. The plurality of data lines 32 are provided so as to correspond the plurality of second groups respectively. The plurality of second groups are constructed by collecting at least one LED driver 40 selected from each of the plurality of first groups without duplication. Each of the plurality of data lines 32 is commonly connected to at least one LED driver 40 belonging to the corresponding second group. That is, the plurality of data lines 32 are constructed with four data lines, namely, first data line 32a that supplies the data to LED drivers 41a, 42a, and 43a disposed in a first column, second data line 32b that supplies the data to LED drivers 41b, 42b, and 43b disposed in a second column, third data line 32c that supplies the data to LED drivers 41c, 42c, and 43c disposed in a third column, and fourth data line 32 that supplies the data to LED drivers 41d, 42d, and 43d disposed in a fourth column.

A transmission line for an auxiliary signal such as a clock signal (to be described later) is omitted in FIG. 2.

Figure 3:
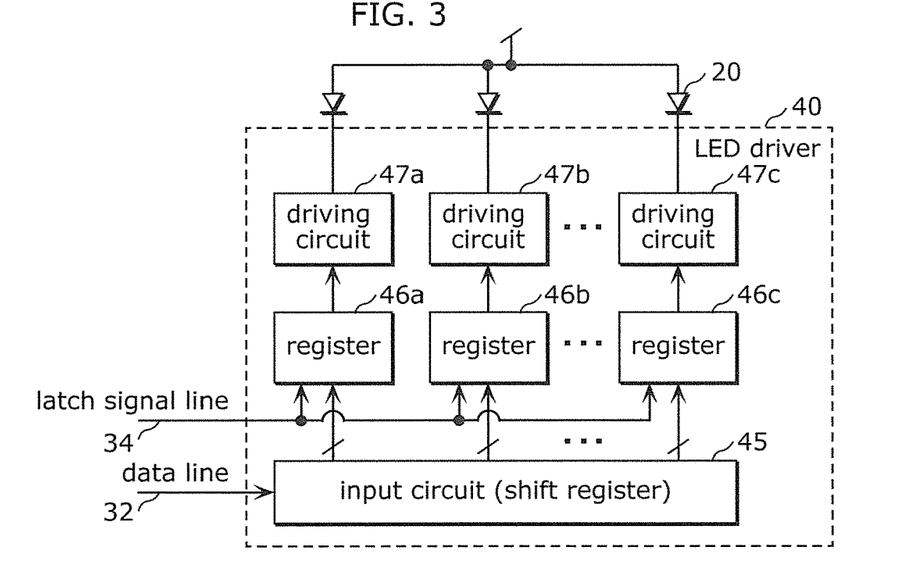
FIG. 3 is a block diagram illustrating a detailed circuit configuration of each LED driver in FIG. 2.

FIG. 3 is a block diagram illustrating a detailed circuit configuration of each LED driver 40 in FIG. 2. LED driver 40 includes input circuit 45, 16 registers 46a to 46c, and 16 driving circuits 47a to 47c.

Input circuit 45 receives the data input from the outside (in this case, from controller 30 through data line 32). Specifically, input circuit 45 is a shift register (for example, 192 (12 bits×16)-bit shift register) that receives a serial signal indicating the dimming level for 16 LEDs 20 to be driven.

16 registers 46a to 46c are a register that holds the data input to input circuit 45 in synchronization with the latch signal input from the outside (in this case, from controller 30 through latch signal line 34). Specifically, each of 16 registers 46a to 46c latches the data (for example, 12-bit data) indicating the dimming level for LED 20 to be driven, from a digit (for example, a digit for 12 bits) corresponding to the shift register constituting input circuit 45.

Each of 16 driving circuits 47a to 47c drives at least one corresponding LED 20 (in this case, 16 LEDs 20 to be driven) in the plurality of LEDs 20 according to the data held by corresponding registers 46a to 46c. Specifically, each of 16 driving circuits 47a to 47c passes current through LED 20 to be driven by PWM control with a duty ratio corresponding to the data held by corresponding registers 46a to 46c.

Next, operation of backlight module 10 having the above configuration will be described below.

Figure 4A:
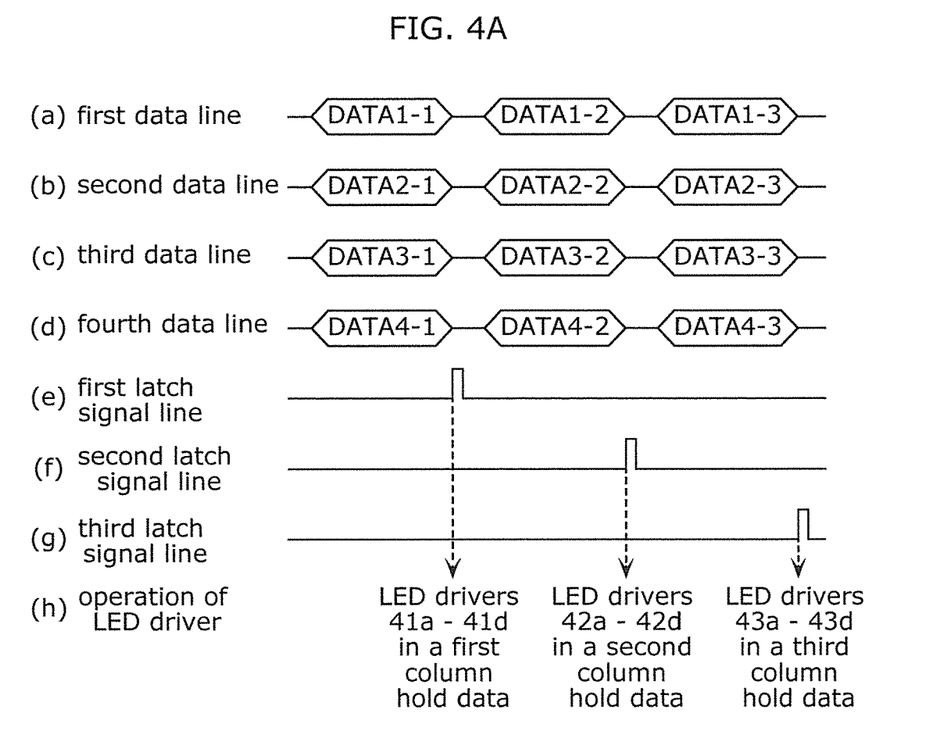
FIG. 4A is a timing chart illustrating an operation of the backlight module of the present exemplary embodiment.

FIG. 4A is a timing chart illustrating the operation of backlight module 10 of the exemplary embodiment. FIG. 4A illustrates timing of data (parts (a) to (d) in FIG. 4A) transmitted through data lines 32a-32d, latch signal (parts (e) to (g) in FIG. 4A) transmitted through latch signal lines 34a-34c, and operation (a part (h) in FIG. 4A) of LED driver 40.

As illustrated in FIG. 4A, controller 30 outputs the latch signal (in this case, a pulse) to first latch signal line 34a after outputting pieces of data (DATA1-1 to DATA4-1) that should be written in LED drivers 41a to 41d disposed in the first row, to first data lines 32a to fourth data line 32d. At this point, the data (each of DATA1-1 to DATA4-1) is serial data (for example, 192 (12 bits×16)-bit serial data) indicating the dimming level for corresponding 16 LEDs 20. Consequently, the pieces of data (DATA1-1 to DATA4-1) output to first data line 32a to fourth data line 32d are input to and held in four LED drivers 41a to 41d disposed in the first row (that is, held in registers 46a to 46c through input circuit 45).

Then, controller 30 outputs the latch signal (in this case, a pulse) to second latch signal line 34b after outputting pieces of data (DATA1-2 to DATA4-2) that should be written in four LED drivers 42a to 42d disposed in the second row, to first data lines 32a to fourth data line 32d. At this point, the data (each of DATA1-2 to DATA4-2) is serial data (for example, 192 (12 bits×16)-bit serial data) indicating the dimming level for corresponding 16 LEDs 20. Consequently, the pieces of data (DATA1-2 to DATA4-2) output to first data line 32a to fourth data line 32d are input to and held in four LED drivers 42a to 42d disposed in the second row (that is, held in registers 46a to 46c through input circuit 45).

Finally, controller 30 outputs the latch signal (in this case, a pulse) to third latch signal line 34c after outputting pieces of data (DATA1-3 to DATA4-3) that should be written in four LED drivers 43a to 43d disposed in the third row to first data lines 32a to fourth data line 32d. At this point, the data (each of DATA1-3 to DATA4-3) is serial data (for example, 192 (12 bits×16)-bit serial data) indicating the dimming level for corresponding 16 LEDs 20.

Consequently, the pieces of data (DATA1-3 to DATA4-3) output to first data line 32a to fourth data line 32d are input to and held in four LED drivers 43a to 43d disposed in the third row (that is, held in registers 46a to 46c through input circuit 45).

As described above, like matrix drive, controller 30 sequentially writes the data in 12 LED drivers 40 in units of rows through four data lines 32a to 32d and three latch signal lines 34a to 34c in synchronization with scan timing of image display. Controller 30 repeats the writing in each frame period.

In the case that a moving image is displayed on a liquid crystal panel, controller 30 outputs the data and the latch signal to the plurality of LED drivers 40 in a backlight scan system in order to improve moving image resolution. Specifically, controller 30 provides a backlight turn-off period in the frame period by adjusting timing of outputting the data and the latch signal to LED driver 40, whereby a period in which the identical image is displayed is shortened to perform pseudo impulse drive.

Figure 4B:
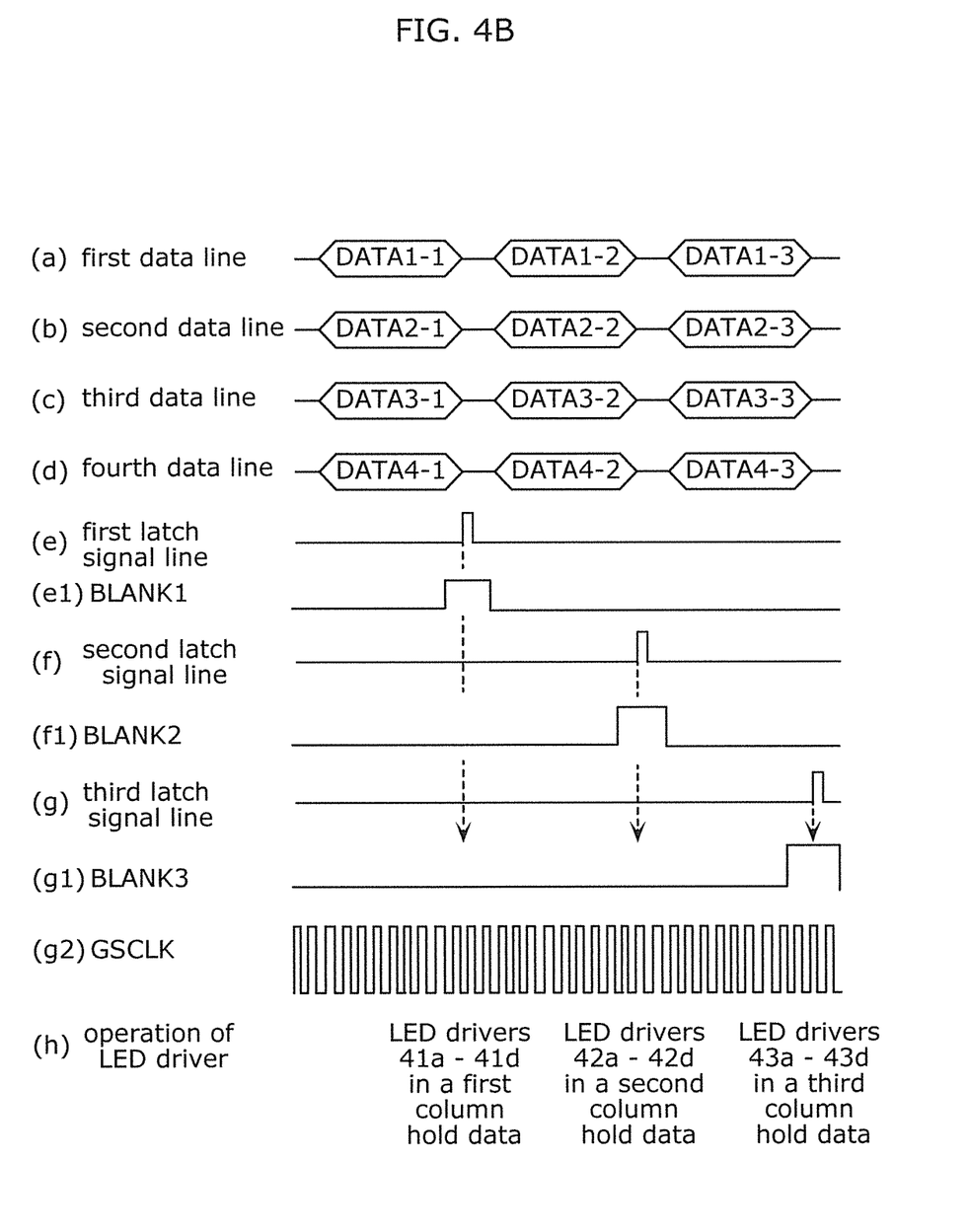
FIG. 4B is a timing chart illustrating an operation of the backlight module in the backlight scan system.

FIG. 4B is a timing chart illustrating the operation of backlight module 10 in the backlight scan system. FIG. 4B is the drawing in which timing of blank signals BLANK1, BLANK2, and BLANK3 (parts (e1), (f1), (g1) in FIG. 4B) and clock signal GSCLK (a part (g2) in FIG. 4B) are added to FIG. 4A.

Blank signals BLANK1, BLANK2, and BLANK3 are control signals that are input from controller 30 to a BLANK terminal (not illustrated) of LED driver 40. LED driver 40 turns off driving circuits 47a to 47c (turns off LED 20) when the BLANK signal input to the BLANK terminal is in a high level.

Clock signal GSCLK is input to a CLK terminal (not illustrated) of LED driver 40. LED driver 40 operates in synchronization with clock signal GSCLK input to the CLK terminal.

When PWM control drive of certain LED 20 is specifically described in the example of FIG. 4B, serial data, which is included in data DATA1-1 and indicates the dimming level for LED 20, is read, and a count value counting the pulse of clock signal GSCLK is decided based on the serial data. Then, LED 20 is blinked in synchronization with the pulse until the number of pulses of input clock signal GSCLK reaches the count value after blank signal BLANK1 is turned off, and LED 20 is turned off after the number of pulses reaches the count value. Thus, each LED 20 is lit at the dimming level according to the serial data of LED 20, the serial data being included in data DATA1-1 to DATA4-3.

As illustrated in FIG. 4B, in the backlight scan system, controller 30 outputs the latch signal while driving circuits 47a to 47c included in the plurality of LED drivers 40 are turned off. That is, the latch signal rises (see parts (e), (0, (g) in FIG. 4B) when blank signals BLANK1, BLANK2, and BLANK3 are in the high level (see parts (e1), (f1), (g1) in FIG. 4B).

Consequently, a drawback that the latch signal acts on clock signal GSCLK as a noise to disturb the lighting of LED 20 can be prevented.

The operation illustrated in FIG. 4B may be applied to the case other than the backlight scan system.

As described above, backlight module 10 of the exemplary embodiment is (claim 1) a backlight that illuminates the liquid crystal display panel from a rear surface, the backlight includes: the plurality of LEDs 20; the plurality of LED drivers 40 including input circuit 45 that receives the externally-input data, registers 46a to 46c that hold the data input to input circuit 45 in synchronization with the externally-input latch signal, and driving circuits 47a to 47c that drive at least one corresponding LED 20 in the plurality of LEDs 20 according to the data held by registers 46a to 46c; controller 30 that is the control circuit that outputs the data and the latch signal to the plurality of LED drivers 40; the plurality of data lines 32 through which the data output from controller 30 is transmitted to the plurality of LED drivers 40; and the plurality of latch signal lines 34 through which the latch signal output from controller 30 is transmitted to the plurality of LED drivers 40. The plurality of latch signal lines 34 are provided so as to correspond a plurality of first groups obtained by dividing the plurality of LED drivers 40, respectively. Each of the plurality of latch signal lines 34 is commonly connected to at least one LED driver 40 belonging to a corresponding one of the plurality of first group. The plurality of data lines 32 are provided so as to correspond a plurality of second groups respectively, the plurality of second groups are constructed by collecting at least one LED driver 40 selected from each of the plurality of first groups without duplication. Each of the plurality of data lines 32 is commonly connected to at least one LED driver 40 belonging to a corresponding one of the plurality of second group.

Consequently, controller 30 and the plurality of LED drivers 40 are connected to each other by connecting the plurality of data lines 32 to the plurality of latch signal lines 34. The plurality of latch signal lines 34 are provided so as to correspond the plurality of first groups obtained by dividing the plurality of LED drivers 40, respectively. The plurality of data lines 32 are provided so as to correspond the plurality of second groups respectively. The second groups are constructed by collecting at least one LED driver 40 selected from each of the plurality of first groups without duplication. The data is simultaneously written in the plurality of LED drivers 40 in units of first groups, and the data writing in all LED drivers 40 is completed.

Thus, controller 30 and the plurality of LED drivers 40 are connected by connecting the plurality of data lines 32 to the plurality of latch signal lines 34, so that the number of wirings can be decreased compared with the case that controller 30 and the plurality of LED drivers 40 are connected one-to-one. Unlike the daisy chain system, it is not necessary to transmit the data between the plurality of LED drivers. Consequently, the control complication caused by the countermeasure for the processing delay or the degradation of the image quality can be prevented even in the scene, such as the multiple division local dimming, in which many LEDs are simultaneously controlled.

In addition, each of the plurality of first groups is the collection of at least one LED driver 40 disposed in the identical row in the plurality of LED drivers 40, and each of the plurality of second groups is the collection of at least one LED driver 40 disposed in the identical column in the plurality of LED drivers 40.

Consequently, the data is written in the plurality of LED drivers 40 in units of rows like the matrix drive, so that the data can be written in synchronization with the scan timing of the image display.

In addition, input circuit 45 is the shift register.

Consequently, the data is serially input to LED driver 40, so that the number of data lines can be decreased compared with the case that the data is transmitted in parallel.

In addition, each of the plurality of LED drivers 40 simultaneously drives the plurality of corresponding LEDs 20.

Consequently, one LED driver 40 simultaneously drives the plurality of LEDs 20, so that the number of LED drivers 40 can be decreased compared with the case that one LED driver 40 drives one LED 20.

In addition, controller 30 sequentially outputs the latch signal to the plurality of latch signal lines 34.

Consequently, when the latch signal is sequentially output to the plurality of latch signal lines 34, data is simultaneously written in the plurality of LED drivers 40 in units of first groups, and the data writing in all LED drivers 40 is completed.

In addition, controller 30 receives the individual dimming information designating the dimming level corresponding to each of the plurality of LEDs 20 and the whole dimming information designating the dimming level common to the plurality of LEDs 20 from the outside, generates the data for each of the plurality of LEDs 20 to emit the light at the adjustment level obtained by multiplying the corresponding individual dimming information by the whole dimming information, and outputs the generated data to the plurality of LED drivers 40 through the plurality of data lines 32.

Consequently, the value obtained by multiplying the individual dimming information and the whole dimming information becomes the adjustment level for the LED, so that not only the dimming level can individually be controlled for the plurality of LEDs but also the dimming level can be controlled common to the plurality of LEDs.

In addition, controller 30 outputs the data signal and the latch signal to the plurality of LED drivers 40 in the backlight scan system.

Consequently, the period in which the identical image is displayed is shortened by providing the backlight turn-off period in the frame period, and the pseudo impulse drive is performed to improve the moving image resolution.

In addition, (claim 8) controller 30 outputs the latch signal while driving circuits 47a to 47c included in the plurality of LED drivers 40 are turned off.

Consequently, a drawback that the latch signal acts on clock signal GSCLK as a noise to disturb the lighting of LED 20 can be prevented.

Next, a specific wiring layout of transmission lines for various signals including the data and the latch signal in the backlight module of the exemplary embodiment and an example of a buffer circuit provided on the transmission line (that is, inserted in the transmission line) will be described below.

Here, the transmission lines for various signals (the clock signal, the data, the latch signal, the mode signal) in the case that the various signals are supplied from the right side and a layout example of the buffer circuit inserted in the transmission line will be described in backlight module 10a according to a modification of the exemplary embodiment including a total of 32 (8×4 rows) LED drivers.

Figure 5:
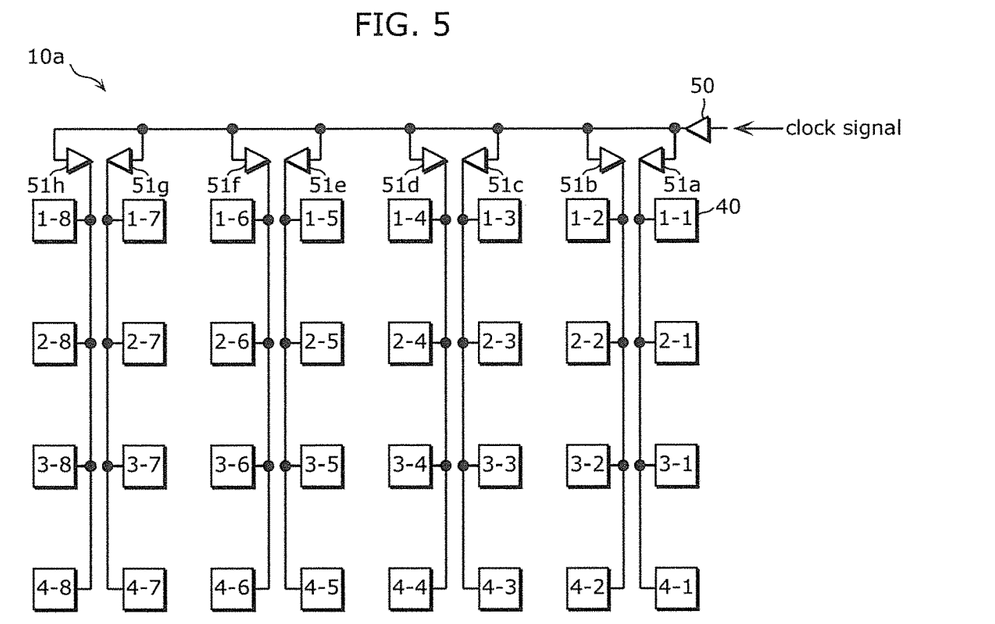
FIG. 5 is a view illustrating a transmission line (clock signal line) for a clock signal and a layout example of a buffer circuit in the backlight module according to a modification of the present exemplary embodiment.

FIG. 5 is a view illustrating the transmission line (clock signal line) for the clock signal and the layout example of the buffer circuit in backlight module 10a according to the modification of the exemplary embodiment. In this case, the transmission line for the clock signal, buffer circuits 50 and 51a to 51h, and 32 LED drivers 40 (1-1 to 1-8, 2-1 to 2-8, 3-1 to 3-8, and 4-1 to 4-8) are illustrated in FIG. 5. The clock signal is a signal used to operate 32 LED drivers 40 and controller 30 in synchronization with each other. For example, the clock signal is used in shift operation of the shift register of LED driver 40.

As illustrated in FIG. 5, backlight module 10a includes first buffer circuit 50 that amplifies current of the one input clock signal and a plurality of second buffer circuits 51a to 51h that supply the clock signal output from first buffer circuit 50 to LED driver 40 while amplifying the current of the clock signal as the buffer circuit for the clock signal.

As a result, buffer circuit 50 amplifies the current of the clock signal supplied in one input, the clock signal is then branched into eight, buffer circuits 51a to 51h amplify the current of each branched clock signal, and the branched clock signal is further branched into four (supplied to four LED drivers 40). That is, the clock signal is supplied to the total of 32 LED drivers 40 through 1 input→8 branches→4 branches.

Consequently, the high-speed clock signal is supplied to each LED driver 40 through a 2-stage buffer circuit (first buffer circuit 50 and second buffer circuits 51a to 51h), so that timing deviation caused by a wiring delay can be prevented.

Figure 6:
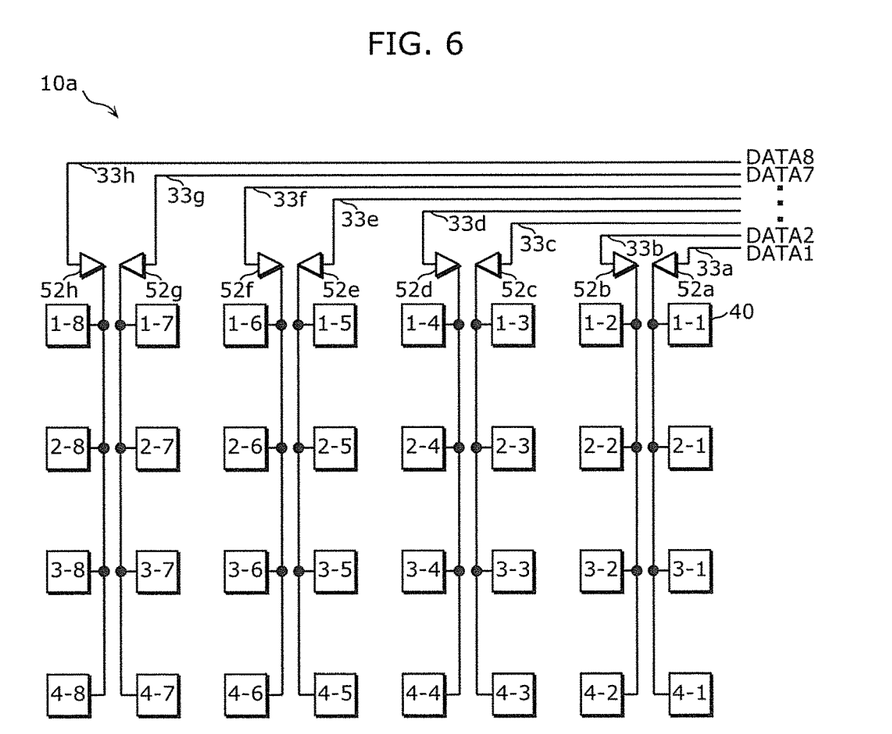
FIG. 6 is a view illustrating a transmission line (data line) for the data and a layout example of a buffer circuit in the backlight module according to the modification of the present exemplary embodiment.

FIG. 6 is a view illustrating the transmission line (data line) for the data and the layout example of the buffer circuit in backlight module 10a according to the modification of the exemplary embodiment. In this case, 8 transmission lines 33a to 33c for the data, 8 buffer circuits 52a to 52h, and 32 LED drivers 40 (1-1 to 1-8, 2-1 to 2-8, 3-1 to 3-8, and 4-1 to 4-8) are illustrated in FIG. 6.

As illustrated in FIG. 6, backlight module 10a includes eight buffer circuits 52a to 52h provided in eight data lines 33a to 33c to amplify the current of the data as the buffer circuit for the data.

As a result, buffer circuits 52a to 52h amplify the currents of the pieces of data supplied in 8 inputs, and each of the pieces of data is branched into four (supplied to four LED drivers 40). That is, the data is supplied to the total of 32 LED drivers 40 through 8 inputs→0 branch→4 branches.

Consequently, each piece of data is supplied to LED driver 40 through corresponding buffer circuits 52a to 52h, so that a propagation delay of the data can be prevented compared with the case that the plurality of LED drivers are directly connected to the identical data line.

Figure 7:
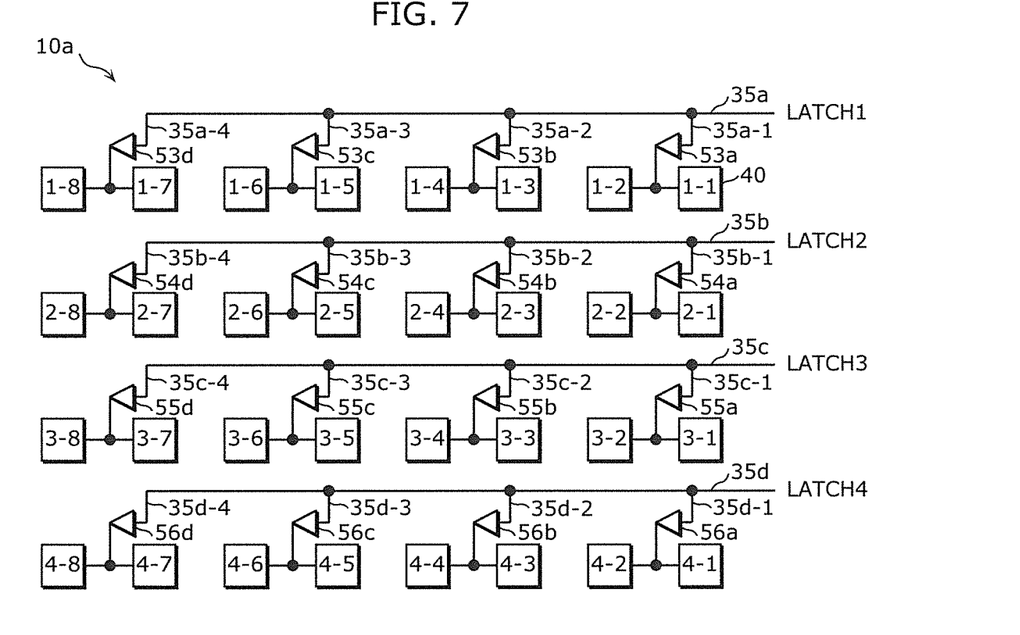
FIG. 7 is a view illustrating a transmission line (latch signal line) for a latch signal and a layout example of a buffer circuit in the backlight module according to the modification of the present exemplary embodiment.

FIG. 7 is a view illustrating the transmission line (latch signal line) for the latch signal and the layout example of the buffer circuit in backlight module 10a according to the modification of the exemplary embodiment. In this case, 4 common bus 35a to 35d for the latch signal, branch lines 35a-1 to 35a-4, 35b-1 to 35b-4, 35c-1 to 35c-4, and 35d-1 to 35d-4, 16 buffer circuits 53a to 53d, 54a to 54d, 55a to 55d, and 56a to 56d, and 32 LED drivers 40 (1-1 to 1-8, 2-1 to 2-8, 3-1 to 3-8, and 4-1 to 4-8) are illustrated in FIG. 7.

As illustrated in FIG. 7, (claim 11) each of four latch signal lines includes a common bus and a plurality of branch lines that are branched from the common bus and connected to LED driver 40. That is, common bus 35a is branched into four branch lines 35a-1 to 35a-4, common bus 35b is branched into four branch lines 35b-1 to 35b-4, common bus 35c is branched into four branch lines 35c-1 to 35c-4, and common bus 35d is branched into four branch lines 35d-1 to 35d-4.

In addition, (claim 11) backlight module 10a includes 16 buffer circuits 53a to 53d, 54a to 54d, 55a to 55d, and 56a to 56d provided while inserted in 16 branch lines 35a-1 to 35a-4, 35b-1 to 35b-4, 35c-1 to 35c-4, and 35d-1 to 35d-4, the buffer circuits 53a to 53d, 54a to 54d, 55a to 55d, and 56a to 56d amplifying the current of the latch signal.

As a result, each of the latch signals supplied in 4 inputs is branched into four, buffer circuits 53a to 53d amplify the current of the latch signal, and each of the branched latch signal is branched into two (supplied to two LED drivers 40). That is, the latch signal is supplied to the total of 32 LED drivers 40 through 4 inputs→4 branches→2 branches.

Consequently, the latch signal is supplied to LED driver 40 through the buffer circuit inserted in each of four branch lines 35a-1 to 35a-4 with respect to each of four latch signal lines 35a to 35d, so that the propagation delay of the latch signal can be prevented compared with the case that the plurality of LED drivers are directly connected to each of four latch signal lines 35a to 35d.

Figure 8:
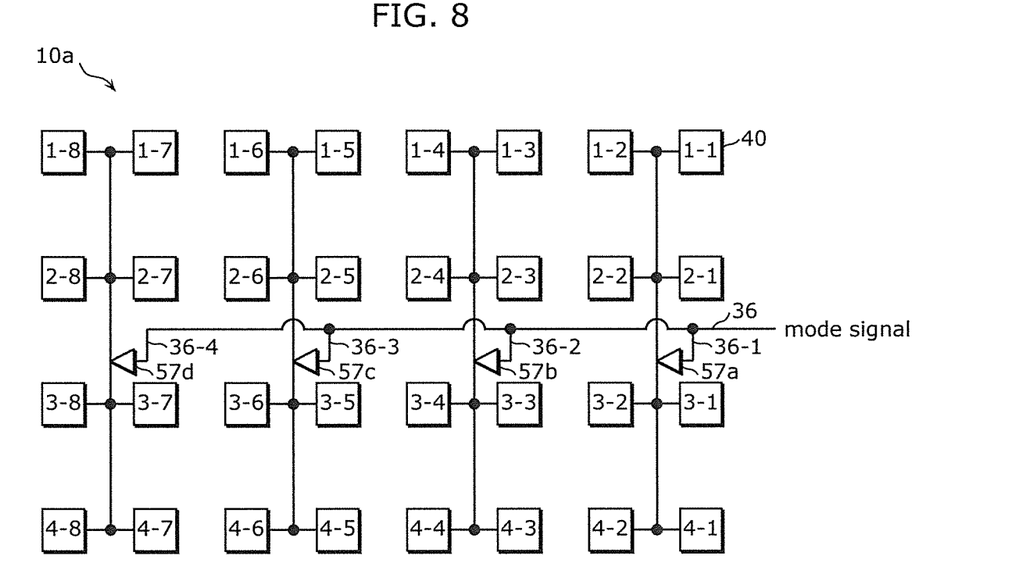
FIG. 8 is a view illustrating a transmission line (mode signal line) for a mode signal and a layout example of a buffer circuit in the backlight module according to the modification of the exemplary embodiment.

FIG. 8 is a view illustrating the transmission line (mode signal line) for a mode signal and the layout example of the buffer circuit in backlight module 10a according to the modification of the exemplary embodiment. In this case, common bus 36 for the mode signal, branch lines 36-1 to 36-4, 4 buffer circuits 57a to 57d, and 32 LED drivers 40 (1-1 to 1-8, 2-1 to 2-8, 3-1 to 3-8, and 4-1 to 4-8) are illustrated in FIG. 8.

As used herein, (claim 12) the mode signal is a signal for switching between a first mode and a second mode, and output from controller 30. In the first mode, LED driver 40 is caused to adjust (that is, perform the PWM control) a duty ratio applying the current to LED 20 based on the input data. In the second mode, LED driver 40 is caused to adjust (that is, control the current value) magnitude of the current. For the mode switching function of LED driver 40, LED driver 40 includes a circuit configuration (shift register, 16 registers, 16 current-varying driving circuits) similar to FIG. 3 as the circuit for the second mode in addition to the circuit for the first mode in FIG. 3, and one of the circuit for the first mode and the circuit for the second mode may be enabled according to the input mode signal. The driving circuit for the first mode and the driving circuit for the second mode may operate simultaneously (that is, simultaneously perform the PWM control and the current value control).

As illustrated in FIG. 8, (claim 12) backlight module 10a includes four buffer circuits 57a to 57d provided while inserted in each of the plurality of branch line 36-1 to 36-4 to amplify the current of the mode signal, as the buffer circuit for the mode signal.

As a result, the mode signal supplied in one input is branched into four, buffer circuits 57a to 57d amplify the current of the mode signal, and each of the branched mode signal is further branched into eight (supplied to eight LED drivers 40). That is, the mode signal is supplied to the total of 32 LED drivers 40 through 1 input→4 branches→8 branches.

Consequently, the mode signal is supplied to LED driver 40 through buffer circuits 57a to 57d inserted in each of four branch lines 36-1 to 36-4, so that the propagation delay of the mode signal can be prevented compared with the case that the plurality of LED drivers are directly connected to the mode signal line.

The backlight module of the present disclosure is described above based on the exemplary embodiment and the modification. However, the present disclosure is not limited to the exemplary embodiment and the modification. It is understood that various modifications to the exemplary embodiment and the modification that are conceived by those skilled in the art, and other exemplary embodiments obtained by a combination of components of the exemplary embodiment and the modification are also included within the scope of the present disclosure without departing from the scope of the present disclosure.

For example, backlight module 10 includes 12 LED drivers in the exemplary embodiment, and backlight module 10a includes 32 LED drivers in the modification. However, there is no limitation on the number of LED drivers constituting the backlight module. In the case that the plurality of LED drivers of the exemplary embodiment or the modification is provided as one set, the backlight module may be constructed with a plurality of sets of the LED drivers. One controller or the plurality of controllers may write the data in parallel in each of the plurality of sets of the LED drivers. Consequently, the backlight module compatible with a large-screen liquid crystal panel such as 4K TV and 8K TV can be constructed.

In the exemplary embodiment and the modification, the same number of LED drivers constituting the backlight module is disposed in each row, and the same number of LED drivers is disposed in each column. However, the disposition of the LED drivers is not limited to the layout of the exemplary embodiment and the modification. The number of LED drivers disposed in one row may vary depending on the row, and the number of LED drivers disposed in one column may vary depending on the column. Consequently, the backlight module compatible with a liquid crystal panel having an outline different from a rectangular shape can be constructed.

In the exemplary embodiment and the modification, the latch signal line extends linearly in the row direction, and the data line extends linearly in the column direction. However, the latch signal line and data line are not limited to the layout of the exemplary embodiment and the modification. The latch signal line may extend in the column direction while the data line extends in the row direction, or the latch signal line and the data line may extend while being bent. Consequently, the backlight module in which the brightness of the backlight can be adjusted in each of the partitions having various shapes at various timing is constructed.

What is claimed is:

1. A backlight module that illuminates a liquid crystal display panel from a rear surface, the backlight module comprising:
   a plurality of LEDs;
   a plurality of LED drivers including an input circuit that receives externally-input data, a register that holds the data input to the input circuit in synchronization with an externally-input latch signal, and a driving circuit that drives at least one corresponding LED in the plurality of LEDs according to the data held by the register;
   a controller that is a control circuit that outputs the data and the latch signal to the plurality of LED drivers;

a plurality of data lines through which the data output from the controller is transmitted to the plurality of LED drivers; and a plurality of latch signal lines through which the latch signal output from the controller is transmitted to the plurality of LED drivers, wherein the plurality of latch signal lines are provided so as to correspond a plurality of first groups obtained by dividing the plurality of LED drivers respectively, each of the plurality of latch signal lines is commonly connected to at least one LED driver belonging to a corresponding one of the plurality of first groups, the plurality of data lines are provided so as to correspond a plurality of second groups respectively, the plurality of second groups are constructed by collecting at least one LED driver selected from each of the plurality of first groups without duplication, and each of the plurality of data lines is commonly connected to at least one LED driver belonging to a corresponding one of the plurality of second groups, wherein each of the plurality of latch signal lines includes a common bus and a plurality of branch lines that are branched from the common bus and connected to a corresponding one of the plurality of LED drivers, the backlight module further comprises a plurality of buffer circuits amplifying current of the latch signal, and each of the plurality of branch lines is provided with a corresponding one of the plurality of buffer circuits, respectively.

2. The backlight module according to claim 1, wherein each of the plurality of first groups is a collection of at least one LED driver disposed in an identical row among the plurality of LED drivers, and each of the plurality of second groups is a collection of at least one LED driver disposed in an identical column among the plurality of LED drivers.

3. The backlight module according to claim 1, wherein the input circuit is a shift register.

4. The backlight module according to claim 1, wherein each of the plurality of LED drivers simultaneously drives a plurality of the corresponding LEDs.

5. The backlight module according to claim 1, wherein the controller sequentially outputs the latch signal to the plurality of latch signal lines.

6. The backlight module according to claim 1, wherein the controller receives individual dimming information designating a dimming level corresponding to each of the plurality of LEDs and whole dimming information designating a dimming level common to the plurality of LEDs from an outside, generates data for each of the plurality of LEDs to emit light at an adjustment level obtained by multiplying a corresponding individual dimming information by the whole dimming information, and outputs the generated data to the plurality of LED drivers through the plurality of data lines.

7. The backlight module according to claim 1, wherein the controller outputs the data signal and the latch signal to the plurality of LED drivers in a backlight scan system.

8. The backlight module according to claim 1, further comprising:

a first buffer circuit that amplifies current of a clock signal which operates the plurality of LED drivers while synchronizing each other; and a plurality of second buffer circuits that supply the clock signal output from the first buffer circuit to the plurality of LED drivers while amplifying the current of the clock signal.

9. The backlight module according to claim 1, further comprising a plurality of buffer circuits provided while inserted in each of the plurality of data lines, the plurality of buffer circuits amplifying current of the data.

10. The backlight module according to claim 1, wherein the plurality of LED drivers including a first mode in which a duty ratio applying current to the LED is adjusted based on the input data, and a second mode in which magnitude of the current is adjusted, the backlight module further comprises: a mode signal line through which a mode signal causing each of the plurality of LED drivers to switch between the first mode and the second mode; and a plurality of buffer circuits amplifying current of the mode signal, the mode signal line includes a common bus and a plurality of branch lines that are branched from the common bus and connected to a corresponding one of the plurality of LED drivers, and each of the plurality of branch lines is provided with a corresponding one of the plurality of buffer circuits, respectively.

11. A display device comprising: a liquid crystal display panel; and the backlight module according to claim 1.

12. A backlight module that illuminates a liquid crystal display panel from a rear surface, the backlight module comprising:

a plurality of LEDs;

a plurality of LED drivers including an input circuit that receives externally-input data, a register that holds the data input to the input circuit in synchronization with an externally-input latch signal, and a driving circuit that drives at least one corresponding LED in the plurality of LEDs according to the data held by the register;

a controller that is a control circuit that outputs the data and the latch signal to the plurality of LED drivers;

a plurality of data lines through which the data output from the controller is transmitted to the plurality of LED drivers; and a plurality of latch signal lines through which the latch signal output from the controller is transmitted to the plurality of LED drivers, wherein the plurality of latch signal lines are provided so as to correspond a plurality of first groups obtained by dividing the plurality of LED drivers respectively, each of the plurality of latch signal lines is commonly connected to at least one LED driver belonging to a corresponding one of the plurality of first groups, the plurality of data lines are provided so as to correspond a plurality of second groups respectively, the plurality of second groups are constructed by collecting at least one LED driver selected from each of the plurality of first groups without duplication, and each of the plurality of data lines is commonly connected to at least one LED driver belonging to a corresponding one of the plurality of second groups, wherein the plurality of LED drivers including a first mode in which a duty ratio applying current to the LED is adjusted based on the input data, and a second mode in which magnitude of the current is adjusted, the backlight module further comprises: a mode signal line through which a mode signal causing each of the plurality of LED drivers to switch between the first mode and the second mode; and a plurality of buffer circuits amplifying current of the mode signal.

13. The backlight module according to claim 12, wherein the mode signal line includes a common bus and a plurality of branch lines that are branched from the common bus and connected to a corresponding one of the plurality of LED drivers, and
each of the plurality of branch lines is provided with a corresponding one of the plurality of buffer circuits, respectively.

14. The backlight module according to claim 12, wherein each of the plurality of first groups is a collection of at least one LED driver disposed in an identical row among the plurality of LED drivers, and
each of the plurality of second groups is a collection of at least one LED driver disposed in an identical column among the plurality of LED drivers.

15. The backlight module according to claim 12, wherein the input circuit is a shift register.

16. The backlight module according to claim 12, wherein each of the plurality of LED drivers simultaneously drives a plurality of the corresponding LEDs.

17. The backlight module according to claim 12, wherein the controller sequentially outputs the latch signal to the plurality of latch signal lines.

18. The backlight module according to claim 12, wherein the controller receives individual dimming information designating a dimming level corresponding to each of the plurality of LEDs and whole dimming information designating a dimming level common to the plurality of LEDs from an outside, generates data for each of the plurality of LEDs to emit light at an adjustment level obtained by multiplying a corresponding individual dimming information by the whole dimming information, and outputs the generated data to the plurality of LED drivers through the plurality of data lines.

19. The backlight module according to claim 12, further comprising:
a first buffer circuit that amplifies current of a clock signal which operates the plurality of LED drivers while synchronizing each other; and
a plurality of second buffer circuits that supply the clock signal output from the first buffer circuit to the plurality of LED drivers while amplifying the current of the clock signal.

20. The backlight module according to claim 12, further comprising a plurality of buffer circuits provided while inserted in each of the plurality of data lines, the plurality of buffer circuits amplifying current of the data.

* * * * *